United States Patent
Steele et al.

(10) Patent No.: US 6,211,877 B1
(45) Date of Patent: *Apr. 3, 2001

(54) METHOD FOR COMMUNICATING BETWEEN PROGRAMMING LANGUAGE CONTROLLED FRAMES AND CGI/HTML CONTROLLED FRAMES WITHIN THE SAME BROWSER WINDOW

(75) Inventors: Douglas W. Steele, Ft. Collins; Todd M. Goin, Loveland; Craig W. Bryant, Ft. Collins, all of CO (US)

(73) Assignee: Hewlett-Packard Co, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/119,369

(22) Filed: Jul. 20, 1998

(51) Int. Cl.[7] .................................................. G06F 3/00
(52) U.S. Cl. ............................ 345/357; 345/346; 707/501
(58) Field of Search ..................................... 345/346, 356, 345/357, 333, 335; 707/501, 513

(56) References Cited

U.S. PATENT DOCUMENTS 5,802,530 * 9/1998 Van Hoff .............................. 707/513
5,848,424 * 12/1998 Scheinkman et al. ................ 707/501
5,870,770 * 2/1999 Wolfe .................................... 707/501
6,025,844 * 2/2000 Parsons ................................. 345/357

* cited by examiner

Primary Examiner—Raymond J. Bayerl
Assistant Examiner—Cao H. Nguyen

(57) ABSTRACT

A Web browser based application that allows communications between programming language driven frames and HTML or CGI/HTML driven frames within the same browser window. A Web browser computer on a network accesses the Web browser based application, which is loaded onto a Web server computer, called a remote support node. A port manager, called the hatdaemon, within the Web browser based application, is used to coordinate communications between the programming language frame and the CGI/HTML frame. Accessing functionality in the CGI/HTML frame can generate a message that the hatdaemon will send to the programming language driven frame. The hatdaemon, which maintains a list of all Web browser computers currently logged onto the application, can send the same message to all logged on computers. Thus, changes made by one user to the data in the application can be immediately communicated to all active browsers logged onto the application.

21 Claims, 6 Drawing Sheets

METHOD FOR COMMUNICATING BETWEEN PROGRAMMING LANGUAGE CONTROLLED FRAMES AND CGI/HTML CONTROLLED FRAMES WITHIN THE SAME BROWSER WINDOW

CROSS REFERENCE TO RELATED APPLICATIONS

This application is related to application Ser. No. 09/065, 263 of Douglas William Steele, Craig William Bryant, Todd M. Goin, and Thomas J. Moos filed Apr. 23, 1998 entitled Method for Tracking Configuration Changes in Networks of Computer Systems Through Historical Monitoring of Configuration Status of Network Devices.

FIELD OF THE INVENTION

This invention relates to Web browsers and more particularly to Web browser based applications. Even more particularly, the invention relates to Web browser based applications displaying multiple frames within the same Web browser window.

BACKGROUND OF THE INVENTION

Since the advent of the World Wide Web, many advances have been made in the appearance and sophistication of Web pages that may be viewed by a user utilizing Web browser software from a computer. Initially, Web browsers could show only one Web page at a time. Today's newer Web browsers, such as Netscape Navigator and Microsoft's Internet Explorer, allow the screen to be divided up into separate frames. Each frame can show the contents of a different Web page from the same Web site or Web pages from different Web sites.

Software applications are now available that are designed to be accessed by one or more users through a Web browser. The application normally resides on a Web server or other computers within a network that is accessible by the user's Web browser software over the network. In such applications, after a user has requested the URL of the Web site for the application, it is quite typical for the user to be presented with a screen having multiple frames. The user may interact in one frame, such as clicking on a hyperlink, and have the resulting Web page returned in the same or one of the other frames. For example, selecting the URL for such a Web browser based application may return to the browser window a Web page that has a logo in a narrow frame across the top of the screen that never changes while the user is connected to the application's Web site. A narrow frame down the left side of the browser window may have a table of contents that lists hyperlinks to all of the additional Web pages available within the site or Web pages to other Web sites. The rest of the screen may be devoted to a main frame that has an initial Web page displayed. When the user clicks on a hyperlink listed in the table of contents frame, the Web page corresponding to the hyperlink is returned and can be displayed in the main frame of the browser window. Hyperlinks may also be present within the Web page currently displayed in the main frame. The user may also click on one of these hyperlinks, causing the Web server to return a new page for display within the main frame.

Many Web browser based applications are designed for multiple users to be logged into the application's Web site at the same time through computer network connections. Each user may have the ability to affect changes in the application through their Web browsers. These changes may have an immediate affect within the application. For example, the application may involve a data base. Each user may be able to add to or delete records from the data base through their Web browser. This however poses a problem. If user A adds or deletes records from the data base, user B has no way of knowing about the changes at the time the changes are made. User B has to update or refresh the browser window in order to become aware of the changes that user A has made. However, since user B does not know that user A has made changes, user B does not know that the browser window being viewed needs to be updated.

Also, some applications that present multiple frames have different processes that control and run within the frames. Some frames may be driven and controlled by C, C++, Java, or some other programming language. Other frames may simply be static HTML driven. Still others may be driven by dynamic CGI/HTML scripts. For example, an application may allow the user to launch a function or task from a frame that is programming language driven. This function or task may alter or change a data base associated with the application. That change may be reflected in a Web page returned to the Web browser in the HTML or CGI/HTML driven frame. A message about that change, in some cases, should also be reflected back in the programming language driven frame. Present methods do not allow for automatically communicating to the programming language driven frame as a result of changes instigated from the HTML or CGI/HTML or programming language driven frames.

Thus there is a need in the art for a method of notifying a Web browser user of a Web browser based application that the information displayed in a frame in the Web browser window needs to be updated due to changes made by that user or other users of the Web browser based application. There is also a need in the art for a Web browser user of a Web browser based application to be able to see automatically within all the frames displayed on the user's Web browser, changes instigated from within a programming language driven frame, a HTML driven frame, or a CGI/HTML driven frame.

It is thus apparent that there is a need in the art for an improved method or apparatus which solves the objects of the invention. The present invention meets these and other needs in the art.

This application is related to application Ser. No. 09/065/262 of Douglas William Steele, Craig William Bryant, Todd M. Goin, and Thomas J. Moos filed Apr. 23, 1998 entitled Method for Tracking Configuration Changes in Networks of Computer Systems Through Historical Monitoring of Configuration Status of Devices on the Network, which is incorporated herein by reference for all that is disclosed and taught therein.

SUMMARY OF THE INVENTION

It is an aspect of the present invention to communicate between frames within the same Web browser window where the frames are controlled by different processes.

It is another aspect of the invention to initiate an action in a HTML or CGI/HTML controlled frame in a Web browser window where the result is displayed in a programming language controlled frame in the same Web browser window.

Yet another aspect of the invention is to initiate an action in a programming language controlled frame in a Web browser window where the result is displayed both in a HTML or CGI/HTML controlled frame and in the in the programming language controlled frame in the same Web browser window.

A further aspect of the invention is to initiate an action in a programming language controlled frame or in a HTML or CGI/HTML controlled frame in a Web browser window whose result is communicated and displayed to the same or a different frame within the same Web browser window, as well as to a programming language controlled frame in a Web browser window in any other Web browsers currently logged onto the same Web browser based application.

The above and other aspects of the invention are accomplished in a Web browser based application that allows communication processes between programming language driven frames and HTML or CGI/HTML driven frames. The Web browser based application is a tracking system for managing and troubleshooting computer system networks. The application can identify what has changed within system configurations for computers or interconnect devices between two points in time in a quick and efficient manner and make those changes readily available to the system administrator for troubleshooting and managing purposes. The application uses a revision control system and configuration information gathering to track and store configuration changes on a historical basis for computers and interconnect devices to aid in managing and troubleshooting networks of computer systems. The configuration data of monitored computers and interconnect devices on a network is gathered on a periodic basis and stored in a data storehouse within a computer, referred to as a remote support node, which is connected to the network. The data storehouse is made up of a data base and the revision control system. The configuration information may be displayed on a graphics display of the remote support node directly, but more typically is accessed through another computer, having a Web browser, that accesses the application on the remote support node over the network.

For monitored computers, the system collects configuration information about the operating system, file system, printing and spooling, boot and shutdown, hardware, software, and network configurations. For monitored interconnect devices the system collects, among other things, configuration information about interfaces, IP addresses, routes, static routes, TCP ports, UDP ports, SNMP variables, human and machine readable configuration files, and installed cards.

Collector software residing on the remote support node gathers configuration data from monitored client computers and interconnect devices on the network. Each configuration item collected from computers and network interconnect devices is specified by a data collection template built into the tracking system. Different templates are available for various computer types and interconnect devices, and each template determines what configuration items can be collected from each particular type of device. All client computers being monitored require special resident software, referred to as client collector software, to help facilitate the secure collection of configuration information. For monitored interconnect devices, no additional software is required, other than the standard SNMP (Simple Network Management Protocol), Telnet (remote login virtual terminal protocol), and TFTP (Trivial File Transfer Protocol) facilities already available within the interconnect devices. However, monitored interconnect devices must grant access to the collection process. Granting this access usually involves making a configuration change to the monitored interconnect device to enable collection.

The collector software collects configuration items at preset collection cycles, normally once a day. At each collection cycle, a snapshot is constructed for each configuration item for each monitored computer or interconnect device, and any differences between the current snapshot and the previous snapshot are stored in the data storehouse. The configuration item may be a text file or the output of a command which displays configuration information in ASCII format. A snapshot is a unit of configuration data as it appears when collected from a monitored device. The actual data collected is stored in the revision control system, while the data base contains information about what has changed and the logical hierarchy of the systems being monitored.

When accessing the stored information through a Web browser, the graphics display is split into two frames. The information's logical hierarchy is displayed in a tree format in one of the frames, and is a programming language based process. The changes found between snapshots within specified collection cycles are displayed in the other frame, and are CGI/HTML based processes. By changing the two collection cycles in the programming language controlled frame, configuration data that has changed between the collection cycles selected may be displayed in the CGI/HTML controlled frame. Configuration items which have changed within the collection cycles selected are indicated by a marker placed on the icon of the item in the tree. If the changed configuration item is in a group in the tree that has not been opened, the marker is propagated up the tree and displayed on the group icon. This notifies the user that at some level below this group icon, a change has occurred in a configuration item. By opening up as many groups and/or subgroups in the tree as are necessary, the user can eventually display the individual item or items that have changed that have the marker.

Port manager software within the remote support node, referred to as the hatdaemon, is used to coordinate communications between the programming language processes and the CGI/HTML processes. Clicking on an icon, button, or item name in the tree in the programming language controlled frame causes a CGI script to be run whose results, in the form of a HTML page, are displayed in the CGI/HTML controlled frame. Or, instead of, or in addition to, displaying the results in the CGI/HTML frame, the output of the CGI script may be returned by the hatdaemon to the programming language controlled frame for display. For example, if the Web browser sends a request for a URL called "Delete Device", a CGI script is run that accesses the data base, deletes the device, notifies the hatdaemon that the device has been deleted, and requests that the hatdaemon notify all other users currently logged into the application's Web site that the device has been deleted. The hatdaemon broadcasts to all active browsers that their data is now bad and needs to be updated by coloring an indicator that had been previously greyed out. Active browser users can then select the colored indicator to update their display incorporating the changes made.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
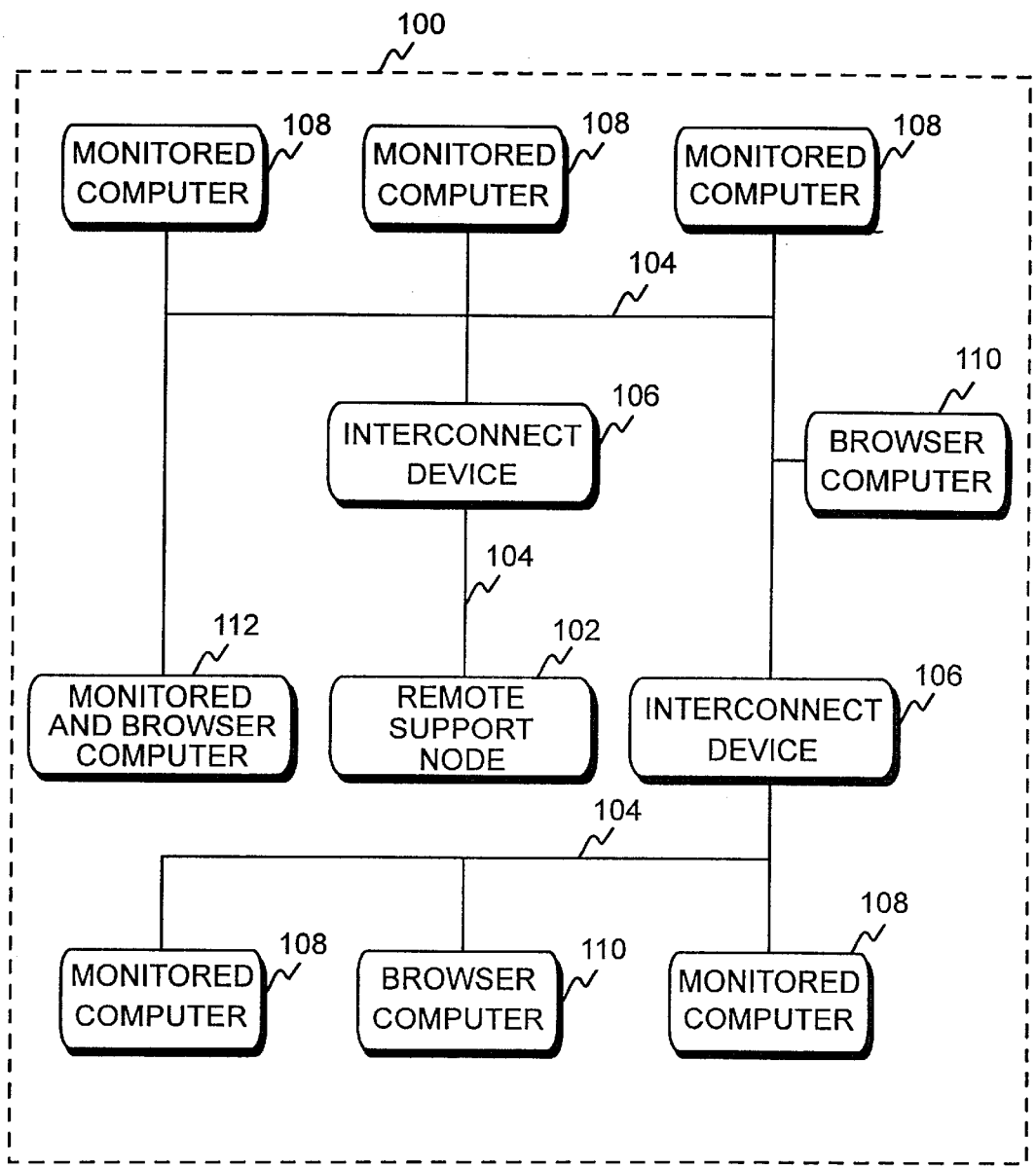
FIG. 1 shows a block diagram of a networked system of computers and interconnect devices having a Web browser based application incorporating the method of communication occurring between frames within the same Web browser window of the present invention.

FIG. 1 shows a block diagram of a networked system of computers and interconnect devices having a Web browser based application incorporating the method of communication occurring between frames within the same Web browser window of the present invention. Referring now to FIG. 1, computer system network 100 has a remote support node 102 connected to the other components of computer system network 100 through computer network connections 104. Computer system network 100 also has interconnect devices 106, which may be routers, bridges, hubs, switches, etc., also connected through computer network connections 104 to remote support node 102. Computer system network 100 may have more or less than the number of interconnect devices 106 shown in FIG. 1.

Computer system network 100 also has monitored computers 108 connected through computer network connections 104 to remote support node 102. Computer system network 100 may have more or less than the number of monitored computers 108 shown in FIG. 1. Browser computers 110 have Web browser software and access remote support node 102 through computer network connections 104 in order to view configuration data stored on remote support node 102. There may be more or less than the number of browser computers 110 on computer system network 100 shown in FIG. 1. Monitored and browser computer 112 is monitored by remote support node 102 through computer network connections 104.

Monitored and browser computer 112 has Web browser software and can also access remote support node 102 through computer network connections 104 in order to view configuration data stored on remote support node 102. There may be more or less than the number of monitored and browser computers 112 on computer system network 100 shown in FIG. 1.

Figure 2:
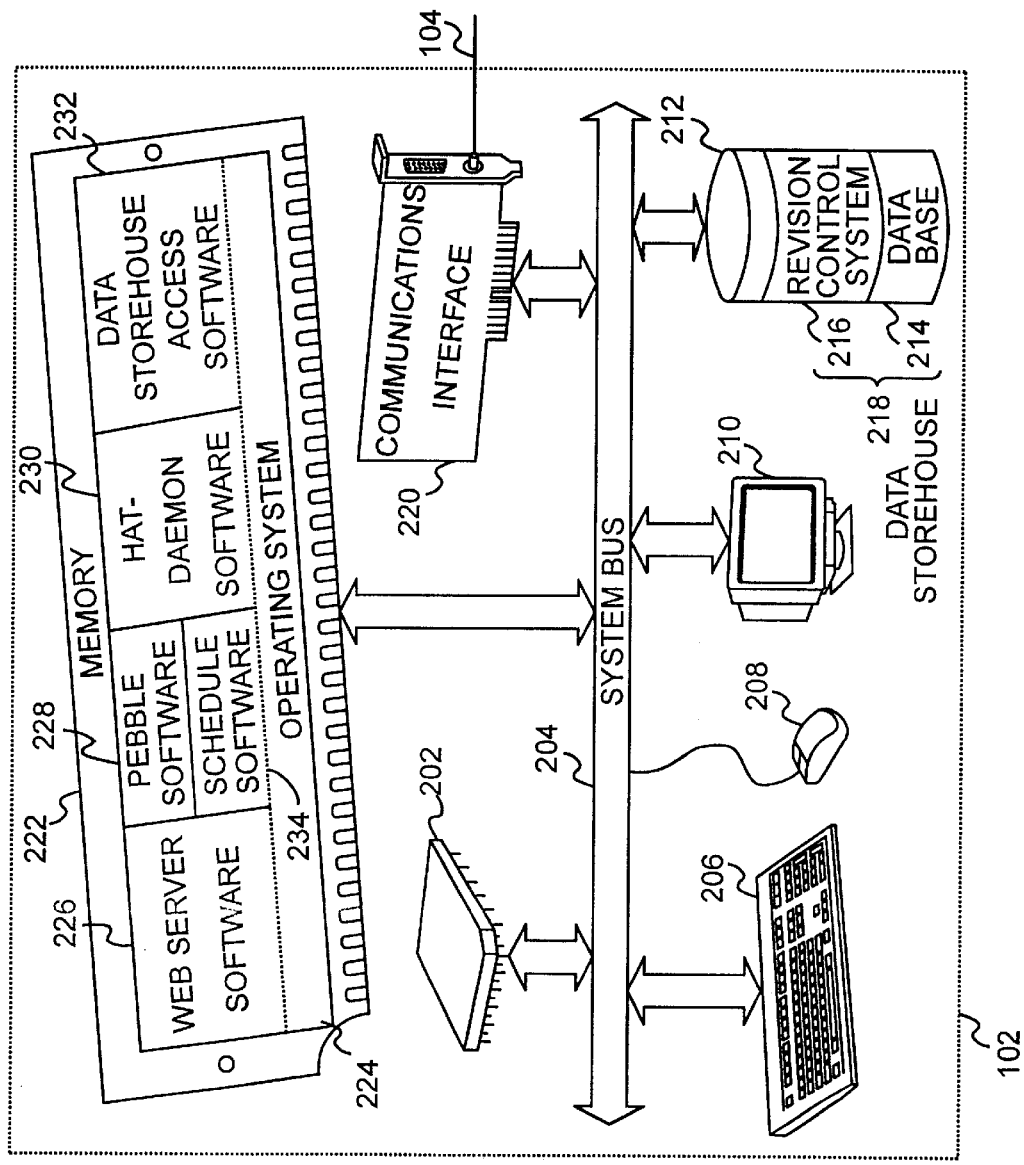
FIG. 2 shows a block diagram of a remote support node of the Web browser based application incorporating the method of communication occurring between frames within the same Web browser window of the present invention.

FIG. 2 shows a block diagram of a remote support node of the Web browser based application incorporating the method of communication occurring between frames within the same Web browser window of the present invention. Referring now to FIG. 2, remote support node 102 contains a processing element 202. Processing element 202 communicates to other elements of remote support node 102 over a system bus 204. A keyboard 206 allows a user to input information into remote support node 102 and a graphics display 210 allows remote support node 102 to output information to the user. A mouse 208 is also used to input information.

Storage device 212 is used to store data and programs within remote support node 102. Within storage device 212 is data storehouse 218, which has two components: data base 214 and revision control system 216. Communications interface 220, also connected to system bus 204, receives information from computer network connections 104. A memory 222, also attached to system bus 204, contains an operating system 224. Wed server software 226, pebble software 228, hatdaemon software 230, data storehouse access software 232, and schedule software 234 that are called up from storage device 212.

Figure 3:
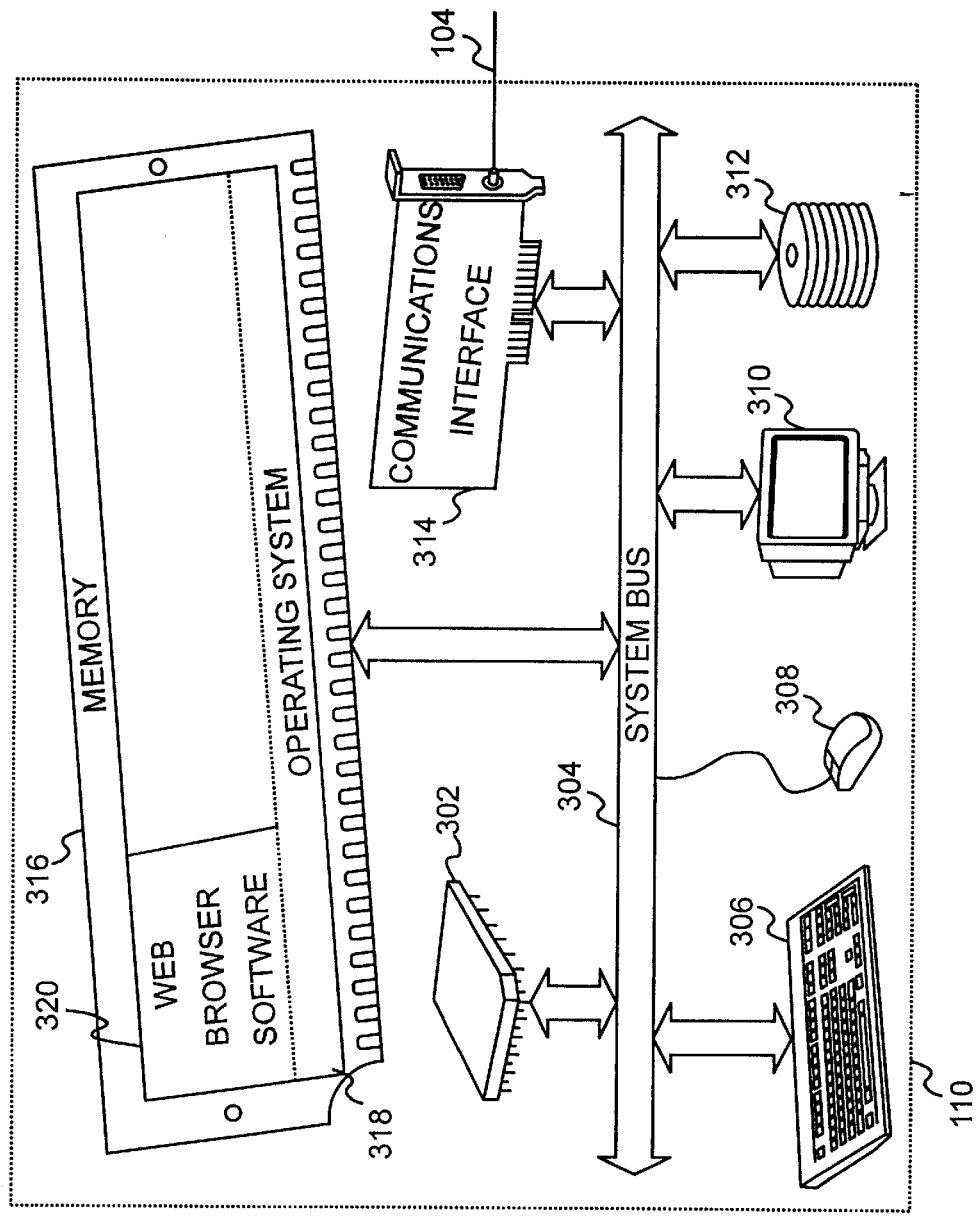
FIG. 3 shows a block diagram of a browser computer of the Web browser based application incorporating the method of communication occurring between frames within the same Web browser window of the present invention.

FIG. 3 shows a block diagram of a browser computer of the Web browser based application incorporating the method of communication occurring between frames within the same Web browser window of the present invention. Referring now to FIG. 3, browser computer 110 contains a processing element 302. Processing element 302 communicates to other elements of browser computer 110 over a system bus 304. A keyboard 306 allows a user to input information into browser computer 110 and a graphics display 310 allows browser computer 110 to output information to the user. A mouse 308 is also used to input information.

Storage device 312 is used to store data and programs within browser computer 110. Communications interface 314, also connected to system bus 304, receives information from computer network connections 104. A memory 316, also attached to system bus 304, contains an operating system 318 and Web browser software 320.

Figure 4:
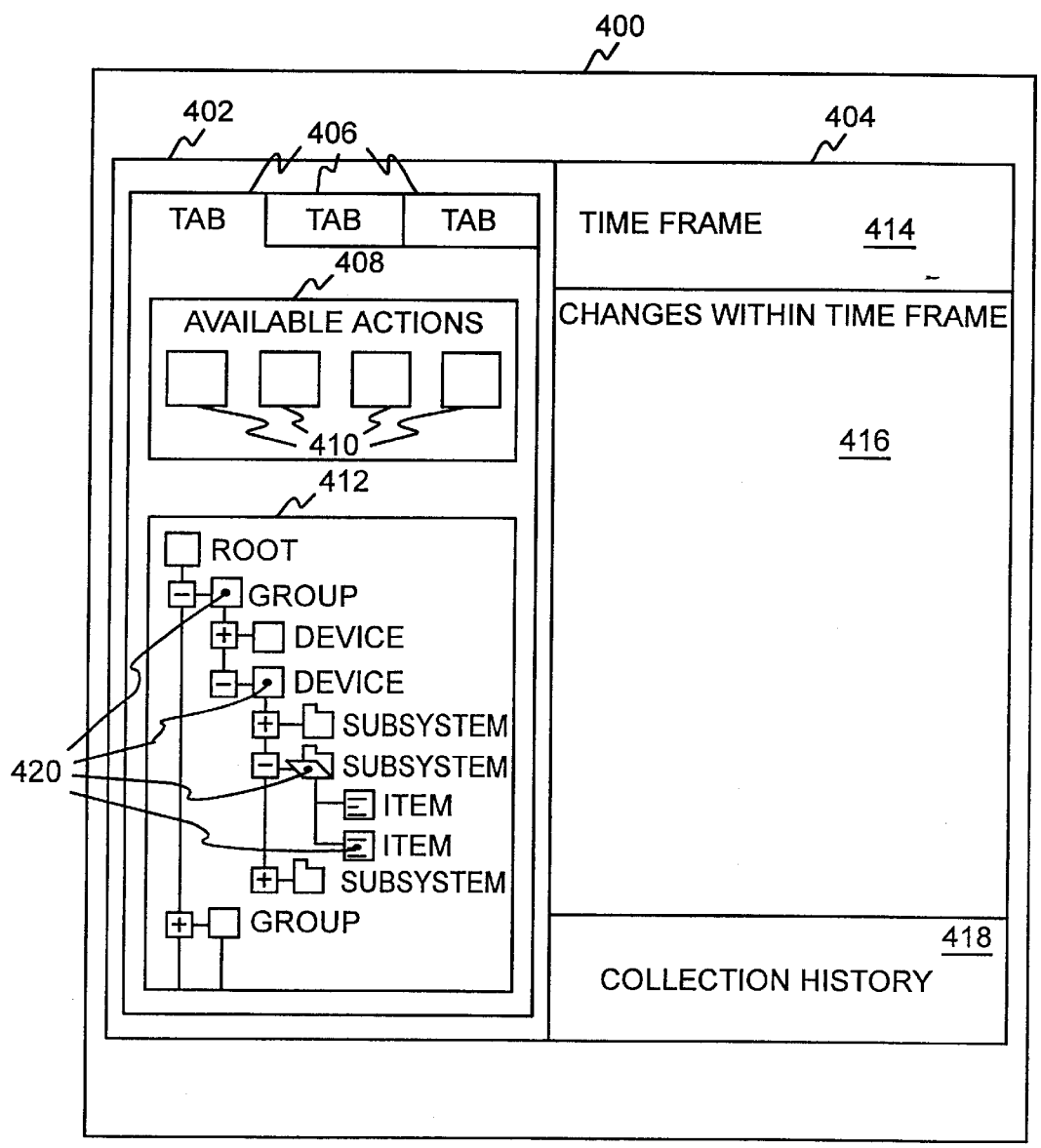
FIG. 4 shows a representation of a screen capture of a Web browser based application incorporating the method of communication occurring between frames within the same Web browser window of the present invention.

FIG. 4 shows a representation of a screen capture of a Web browser based application incorporating the method of communication occurring between frames within the same Web browser window of the present invention. Referring now to FIG. 4, screen capture 400 of graphics display 310 (FIG. 3) of browser computer 110 or monitored and browser computer 112 (FIG. 1) has loaded up Web browser software 320 (FIG. 3), a first task, and has requested the URL (Universal Resource Locator) of the Web browser based application incorporating the method of communication occurring between frames within the same Web browser window of the present invention. Web server software 226 (FIG. 2), a second task, running on remote support node 102 (FIG. 1), has returned the HTML page requested for display on graphics display 310. One skilled in the art will recognize that the Web browser based application and Web server software 226 may also reside within browser computer 110. In the preferred embodiment of the invention, the Web browser based application and Web server software 226 reside within remote support node 102.

Screen capture 400 is divided into two frames, tracking tree frame 402, which is programming language controlled, and data display frame 404, which is HTML OR CGI/HTML controlled. In the preferred embodiment of the invention, Java is the programming language used to control tracking tree frame 402. When the HTML page is returned, the applet returned with the HTML page runs, creating and displaying tracking tree frame 402. The applet runs constantly in tracking tree frame 402 and can respond to events. It is also multi-threaded. A thread will wake up every few minutes and ask what the state of the system is, and will change the display of tracking tree frame 402 based on the state accordingly. Another thread sits and listens for any communications directed to it, and can respond to such communications.

Tabs 406 may be selected in tracking tree frame 402 to access different functionality of the tracking system. Selecting an administration tab gives the user access to the administrative functions of the Web based browser application to set up the application. Users and user accounts may be added or deleted; computers and interconnect devices may be added or deleted; groups may be added or deleted; the collection schedule may be set or changed; and individual items may be enabled or disabled from collection. Selecting a log tab allows the user to access the logging functions of the Web based browser application to view log entries of collection activities, errors, and alarms.

Selecting a tracking tab, as shown in FIG. 4, gives the user access to the Web based browser application's tracking functions. Selecting the tracking tab gives the user access to tracking tree 412 and available actions 408. By selecting buttons 410 within available actions 408, the user can alter how the stored data is displayed in data display frame 404. For example, by selecting different buttons 410, the user can change the collection cycles for which tracking tree 412 displays configuration information; show configuration status for a particular collection cycle; show only the changes in configuration status between two particular collection cycles selected; update the display to reflect current configuration information; or access help files.

Tracking tree 412 is an expandable index of configuration items being tracked for each monitored device and is constructed from the data in data base 214 (FIG. 2). This is done so that when a user logs in to the tracking system and it becomes time to populate tracking tree 412, it will happen very quickly. When a user views tracking tree 412 and selects a data item that has changed, revision control system 216 (FIG. 2) supplies the data regarding the changes that were made in that data item and displays those changes in data display frame 404. Tracking tree 412 utilizes a data hierarchy to display configuration information. To view information about groups, devices, and individual configuration items, also referred to as data items, the user may click on the [+] symbols to expand the tree and then select the name of the item of interest.

As a way of indicating to the user that a change has occurred in a configuration item, change indicators 420 are placed on or next to each icon in the tree in the chain starting with the group node level down to where the change has occurred at the item node level. Change indicators 420 may be a mark of any kind or of any color. If a change has occurred in a configuration item from comparing the two collection cycles selected, and only the group nodes are displayed when tracking tree frame 402 is displayed, a change indicator 420 will be on or next to its group node icon. Clicking on the [+] symbol for the group node icon will expand the tree to list all the devices under that group node. The device in which change has occurred will have a change indicator 420 on or next to its device icon. Clicking on the [+] symbol for the device icon will expand the tree to list all the subsystems, if any, under that device node. The subsystem, if any, in which change has occurred will have a change indicator 420 on or next to its subsystem icon. Clicking on the [+] symbol for the subsystem icon will expand the tree to list all the data items under that subsystem node. The data item in which change has occurred will have a change indicator 420 on or next to its data item icon.

Selecting a device name in tracking tree 412 displays the name of the data collection template assigned to the device. Selecting individual configuration item names displays information about the item. Right clicking on any name, icon, or symbol in tracking tree 412 accesses a pop-up menu which provides access to appropriate actions. Selecting a Properties option from the pop-up menu displays information about the item selected. Time frame 414 displays the dates of the two collection cycles selected for displayed changes. Changes within time frame 416 displays the changes found in data items between the two collection cycles shown in time frame 414. Collection history 418 displays the date and time that the data item in question changed.

Figure 5:
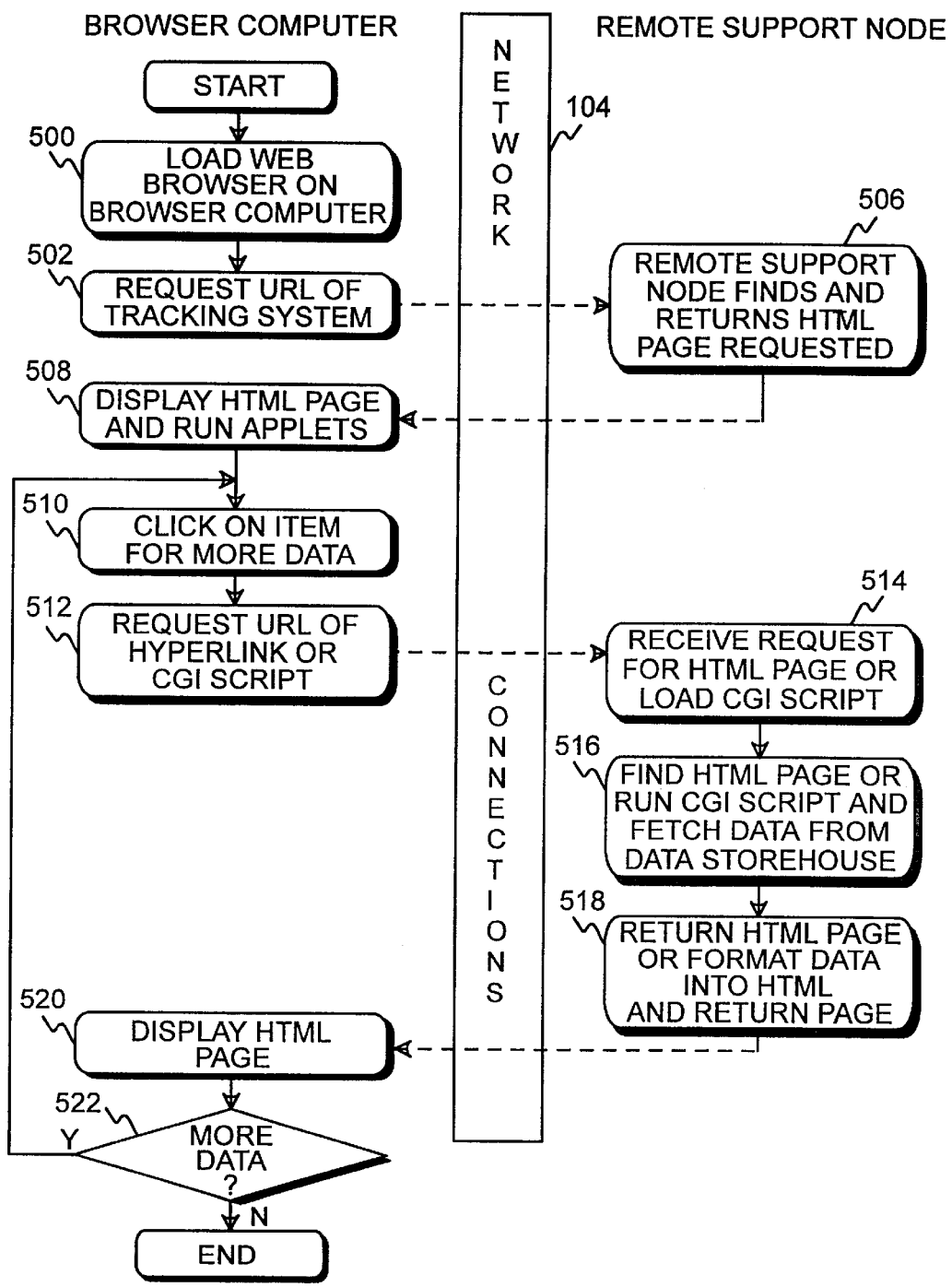
FIG. 5 shows a flow diagram of the method of communication occurring between frames within the same Web browser window of the present invention.

FIG. 5 shows a flow diagram of the method of communication occurring between frames within the same Web browser window of the present invention. Referring now to FIG. 5, in block 500 Web browser software 320 (FIG. 3) is loaded on browser computer 110 (FIG. 1). In block 502, a user requests the URL of the Web browser based application incorporating the method of communication occurring between frames within the same Web browser window of the present invention. Web browser software 320 establishes a connection through computer network connections 104 (FIG. 1) to remote support node 102 (FIG. 1). In block 506, remote support node 102 finds and returns to browser computer 110 through computer network connections 104 the HTML page requested in block 502.

In block 508, the HTML page received from block 506 is displayed in screen capture 400 (FIG. 4) of graphics display 310 (FIG. 3) on browser computer 110. The applet associated with the HTML page that runs automatically upon display is run at this time. The screen display is divided into tracking tree frame 402 and data display frame 404 (FIG. 4).

The user may choose to receive more data in block 510 by clicking on any of several hyperlinks that may be displayed in screen capture 400 of graphics display 310. Additionally, certain buttons, tabs, and data item names, which act like hyperlinks but are really applet controlled processes, may be clicked on in tracking tree frame 402 to receive more data. Tabs 406, available actions buttons 410, and selecting data item names in tracking tree 412 (FIG. 4) are examples of such applet controlled processes. After clicking on one of these hyperlinks or applet controlled items, in block 512 browser computer 110 requests the URL associated with the hyperlink, or initiates the applet controlled process. In the preferred embodiment of the invention, the applet controlled processes are requests for Common Gateway Interface (CGI) PERL scripts. The request for the URL or the CGI script is sent through computer network connections 104 and received by remote support node 102 in block 514, where the request for the HTML page is received, or the requested CGI script is loaded. In block 516 remote support node 102 finds the HTML page, or the CGI script communicates with hatdaemon software 230 (FIG. 2) to get permission to run, if required. If permission is granted, or not required, the CGI script runs, fetching or altering data from data storehouse 218 (FIG. 2). In block 518 the HTML page, or the data fetched or altered from data storehouse 218 which gets formatted into HTML format, is returned through computer network connections 104 to browser computer 110 for display on graphics display 310.

In block 520 the HTML page from either the requested URL or CGI script is normally displayed in data display frame 404, displaying the data requested by the user. In some cases, the CGI script that was run may not return any data for display in data display frame 404. Instead, a message of some kind may be posted to tracking tree frame 402.

If more hyperlinks or applet controlled processes are to be requested by the user, then in block 522 control returns to block 510 where the user may click on a next hyperlink or applet controlled process. If the answer in block 522 is no, the user may then select other URL addresses unrelated to the tracking system, close Web browser software 320 and load other programs, or leave the current HTML pages displayed.

Figure 6:
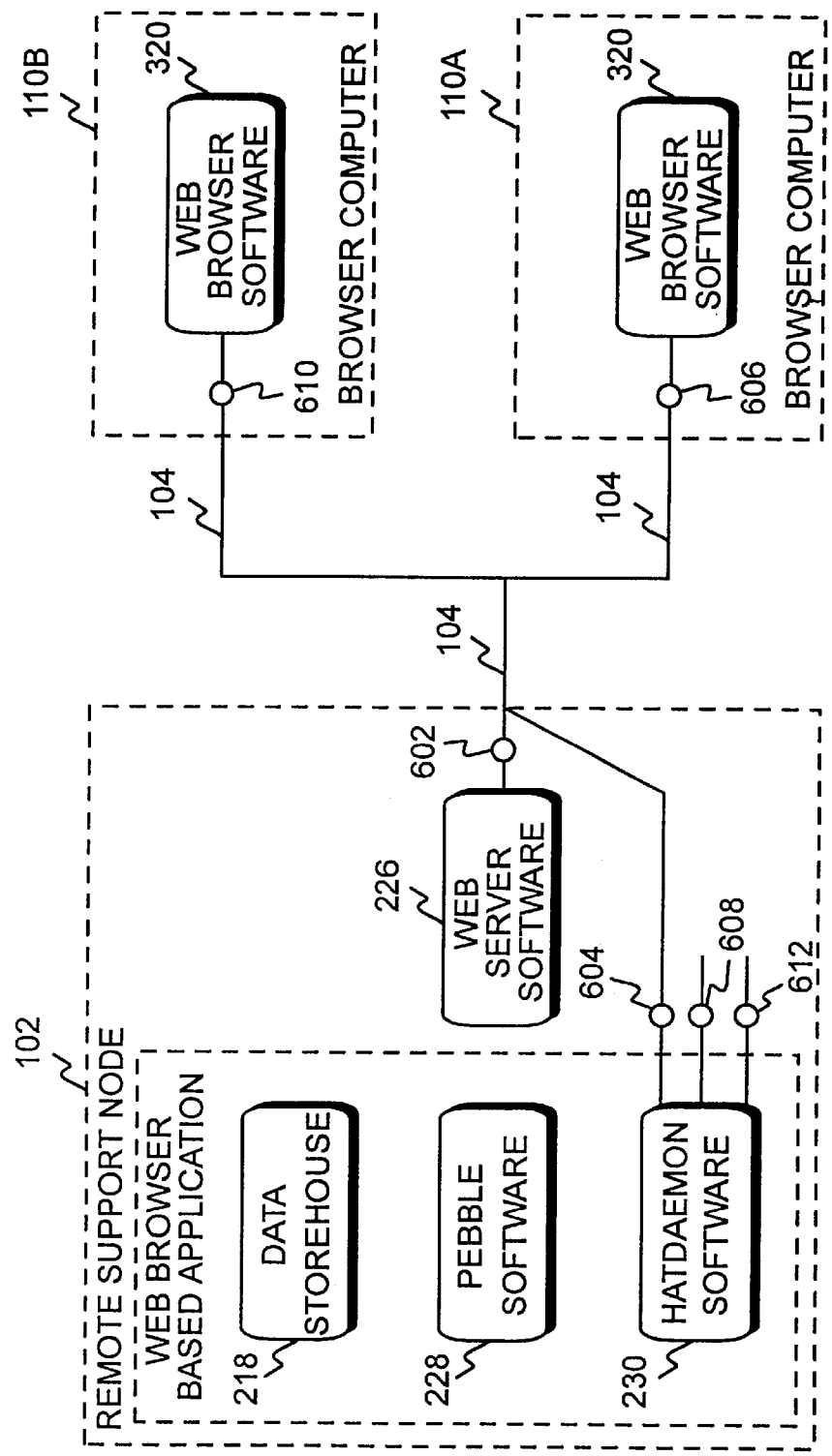
FIG. 6 shows a block diagram of the communication pathways created that enable the method of communication occurring between frames within the same Web browser window of the present invention.

FIG. 6 shows a block diagram of the communication pathways created that enable the method of communication occurring between frames within the same Web browser window of the present invention. Referring now to FIG. 6, Web server software 226 (also shown in FIG. 2), and the Web browser based application, which includes data storehouse 218, pebble software 228, and hatdaemon software 230 (also shown in FIG. 2), are loaded into memory on remote support node 102 (also shown in FIG. 1). Upon loading, Web server software 226 establishes connect pathway 602, a communications port, and hatdaemon software 230 establishes accept pathway 604, a communications port.

A user on browser computer 110A loads Web browser software 320 (also shown in FIG. 3), establishing a connection to the network through browser pathway 606 and computer network connections 104 (also shown in FIG. 1). The connection may be based on TCP/IP (Transmission Control Protocol/Internet Protocol), or any other appropriate communications protocol. The user then requests from Web browser software 320 in browser computer 110A the URL of the Web browser based application running on remote support node 102 (also shown in FIG. 1).

Web server software 226 (also shown in FIG. 2), which listens for HTML requests for service on connect pathway 602, receives the request on connect pathway 602 and forks itself. Web server software 226 finds the HTML page requested and then returns the HTML page through connect pathway 602, through computer network connections 104, to browser computer 110A, through browser pathway 606.

Web browser software 320 displays the HTML page in graphics display 310 (FIG. 3) of browser computer 110A in multiple frames. A login screen is presented to the user within tracking tree frame 402 (FIG. 4), which is programming language controlled. The user types in the user's name and password, which are sent through browser pathway 606 and computer network connections 104 back to the Web browser based application in remote support node 102.

Upon receiving the user name and password in remote support node 102, a connection is made to accept pathway 604. Hatdaemon software 230 then invokes a pebble from pebble software 228 that queries data storehouse 218 (also shown in FIG. 2) to verify the user name and password received. If the user name and password are verified, hatdaemon software 230 registers that browser computer 110A is logged on, creates logged browser pathway 608, and passes the location of logged browser pathway 608 back to the applet running in tracking tree frame 402 in graphics display 310 of browser computer 110A. Any subsequent pebbles run from pebble software 228 that send output to logged browser pathway 608 will have that output sent to browser computer 110A through the communication pathway established by accept pathway 604, computer network connections 104, and browser pathway 606. In the preferred embodiment of the invention, connect pathway 602, accept pathway 604, browser pathway 606, and logged browser pathway 608 are sockets.

Likewise, a second user on browser computer 110B may also access the Web browser based application. After loading Web browser software 320 and establishing a connection to the network through browser pathway 610 and computer network connections 104, the second user requests the URL of the Web browser based application.

Web server software 226, which is still listening for HTML requests on connect pathway 602, receives the request from browser computer 110B on connect pathway 602, and then forks itself again. The HTML page requested is found and returned through connect pathway 602 and computer network connections 104 to browser computer 110B through browser pathway 610.

Web browser software 320 displays the HTML page in graphics display 310 of browser computer 110B in multiple frames. The login screen is presented to the second user within tracking tree frame 402. The second user types in the second user's name and password, which are sent through browser pathway 610 and computer network connections 104 back to the Web browser based application in remote support node 102 through connect pathway 602.

Upon receiving the second user's name and password in remote support node 102, a connection is made to accept pathway 604. Hatdaemon software 230 invokes the pebble from pebble software 228 that queries data storehouse 218 to verify the second user name and password received. If the second user name and password are verified, hatdaemon software 230 registers that browser computer 110B is logged on, creates logged browser pathway 612, and passes the location of logged browser pathway 612 back to the applet running in tracking tree frame 402 in graphics display 310 of browser computer 110B. Any subsequent pebbles run from pebble software 228 that send output to logged browser pathway 612 will have that output sent to browser computer 110B through the communication pathway established by accept pathway 604, computer network connections 104, and browser pathway 610. In the preferred embodiment of the invention, browser pathway 610 and logged browser pathway 612 are sockets. One skilled in the art will recognize that many more browser computers 110 could be shown logged on in FIG. 6. Only two are shown for simplicity.

The communication pathways between the Web browser based application on remote support node 102 and all logged on browser computers 110 established and monitored by hatdaemon software 230 enable communications between the CGI/HTML controlled frames of browser computers 110 to the programming language controlled frames of browser computers 110.

For example, the user at browser computer 110A may access a function of the Web based browser application from within tracking tree frame 402 by clicking on a button, such as "Delete Device". Clicking on the button starts the running of a routine within the applet that requests a CGI script.

The request for the CGI script is received by remote support node 102 through browser pathway 606, computer network connections 104, and connect pathway 602. The CGI script is loaded and communicates with hatdaemon software 230 (FIG. 2) to get permission to run. If permission is granted, the CGI script runs, fetching or altering data from data storehouse 218 (FIG. 2). The data fetched or altered from data storehouse 218 is formatted into HTML format and returned to browser computer 110A through connect pathway 602, computer network connections 104, and browser pathway 606 for display on graphics display 310 in data display frame 404, displaying a list of devices.

The user then chooses the device he wants to delete from the tracking system by clicking on the device name. Clicking on the name of the device requests another CGI script. The request for the CGI script is received by remote support node 102 through browser pathway 606, computer network connections 104, and connect pathway 602. The CGI script is loaded and communicates with hatdaemon software 230 (FIG. 2) to get permission to run. If permission is granted, the CGI script runs, deleting the device from the tracking system by making the appropriate changes to data storehouse 218.

If the delete was successful, the CGI script sends a message back to browser computer 110A through hatdaemon software 230 using logged browser pathway 608, accept pathway 604, computer network connections 104, and browser pathway 606 for display on graphics display 310 in tracking tree frame 402. The message tells the user to update the display, since the data in data storehouse 218 has been changed. The message may be a line of text. Or, there may be a reload button in the browser window, which has been greyed out, but upon receiving the message, becomes colored and active. The use may then click on the reload button, which will request yet another CGI script that will run on remote support node 102, accessing the data base, and getting an updated HTML page returned to the browser window which reflects that the device has been deleted.

Hatdaemon software 230, which maintains a list of all logged on users, may also send the same message to each of the users currently logged onto the application, if so directed. Thus, changes affected by one user can be immediately received back by that user, as well as all other users currently logged on to the application.

A similar process occurs for other functions available in the Web based browser application. The thread that blocks on the read of the socket on the browser computer can receive messages sent by hatdaemon software 230. Upon awakening and detecting that a message has been received, the message name is run through a table containing all possible messages that can be received and acted upon. When the message name is found in the table, the appropriate routines are called within the applet associated with the particular message name. Typically, such routines will reconnect to remote support node 102, ask for a new set of data, rebuild a HTML page, and return the page to browser computer 110.

Having described a presently preferred embodiment of the present invention, it will be understood by those skilled in the art that many changes in construction and circuitry and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

What is claimed is:

1. A method of communication occurring between frames within a Web browser window, said method comprising the steps of:
    (a) displaying, within said Web browser window running in a first task in a graphics display of a first Web browser computer, an HTML page having a first frame and a second frame, wherein said first frame is programming language controlled;
    (b) receiving click input on a hyperlink in said first frame of said Web browser window in said graphics display of said first Web Browser computer wherein said click input causes a display of a web page in said second frame of said Web browser computer;
    (c) receiving click input on a hyperlink in said second frame in said Web browser window in said graphics display of said first Web browser computer;
    (d) requesting a URL for said hyperlink from a second task within said first Web browser computer;
    (e) receiving said URL for said hyperlink from said second task;
    (f) running a predetermined program defined by said URL for said hyperlink from said second task;
    (g) sending an instruction from said predetermined program to port manager software in said second task, causing said port manager software to send a message to said first frame in said Web browser window in said graphics display of said first Web browser computer; and
    (h) displaying said message in said first frame in said Web browser window in said graphics display of said first Web browser computer.

2. A method of communication occurring between frames within a Web browser window according to claim 1 wherein step (a) further comprises displaying said HTML page having said first frame and said second frame, wherein said second frame is HTML controlled.

3. A method of communication occurring between frames within a Web browser window according to claim 1 wherein step (a) further comprises displaying said HTML page having said first frame and said second frame, wherein said second frame is CGI/HTML controlled.

4. A method of communication occurring between frames within a Web browser window according to claim 1 wherein step (f) further comprises running said predetermined program wherein said predetermined program is a CGI script.

5. A method of communication occurring between frames within a Web browser window according to claim 1 wherein step (h) further comprises displaying said message as a line of text in said first frame in said Web browser window in said graphics display of said first Web browser computer.

6. A method of communication occurring between frames within a Web browser window according to claim 1 wherein step (h) further comprises displaying said message by coloring a button in said first frame in said Web browser window in said graphics display of said first Web browser computer, wherein said button had been greyed out prior to displaying said message by coloring said button.

7. A method of communication occurring between frames within a Web browser window according to claim 1, wherein step (f) further comprises step (f1), step (g) further comprises step (g1), and step (h) further comprises step (h1):
    (f1) retrieving a next HTML page defined by said predetermined program from said second task;
    (g1) sending said next HTML page to said second frame in said Web browser window in said graphics display of said first Web browser computer; and
    (h1) displaying said next HTML page in said second frame in said Web browser window in said graphics display of said first Web browser computer.

8. A method of communication occurring between frames within a Web browser window according to claim 1, wherein step (d) is replaced by the following new step (d):
    (d) requesting a URL for said hyperlink from a second task within a remote support node computer, wherein said remote support node computer is connected to said first Web browser computer through a first computer network connection.

9. A method of communication occurring between frames within a Web browser window according to claim 8, wherein step (a) further comprises step (a1):
    (a1) displaying, within a Web browser window in a graphics display of a second Web browser computer, said HTML page having a first frame and a second frame, wherein said first frame is programming language controlled, and further wherein said second Web browser computer is connected to said remote support node computer through a second computer network connection.

10. A method of communication occurring between frames within a Web browser window according to claim 9, wherein step (a1) further comprises step (a1a):
   (a1a) displaying, within a plurality of additional Web browser computers, wherein each of said plurality of additional Web browser computers has a Web browser window in a graphics display, said HTML page having a first frame and a second frame, wherein said first frame is programming language controlled, and further wherein each of said plurality of Web browser computers are connected to said remote support node computer through a plurality of computer network connections.

11. A method of communication occurring between frames within a Web browser window, said method comprising the steps of:
   (a) displaying, within said Web browser window running in a first task in a graphics display of a first Web browser computer, an HTML page having a first frame and a second frame, wherein said first frame is programming language controlled, and further displaying, within a Web browser window in a graphics display of a plurality of additional Web browser computers, said HTML page;
   (b) receiving click input on a symbol in said second frame in said Web browser window in said graphics display of said first Web browser computer;
   (c) requesting a predetermined program for said symbol from a second task within a remote support node computer, wherein said remote support node computer is connected to said first Web browser computer through a first computer network connection;
   (d) running said predetermined program defined by said symbol;
   (e) sending an instruction from said predetermined program to port manager software in said second task within said remote support node computer, causing said port manager software to send a message to said first frame in said Web browser window in said graphics display of said first Web browser computer and to said first frame in said Web browser window of each of said plurality of additional Web browser computers; and
   (f) displaying said message in said first frame in said Web browser window in said graphics display of said first Web browser computer, and in said first frame in said Web browser window in said graphics display of each of said plurality of additional Web browser computers.

12. A method of communication occurring between frames within a Web browser window according to claim 11, wherein step (a) further comprises the steps (a0a) through (a0h) performed before step (a):
   (a0a) loading Web browser software into a memory in said first Web browser computer;
   (a0b) loading Web server software into a memory in said remote support node computer;
   (a0c) loading a Web browser based application into said memory in said remote support node computer, said Web browser based application further comprising said port manager software and pebble software, wherein said pebble software contains said predetermined program;
   (a0d) sending a first request, with said Web browser software, for a URL for said Web browser based application;
   (a0e) receiving said first request for said URL for said Web browser based application by said Web server software in said remote support node computer through said first computer network connection;
   (a0f) finding said HTML page in said remote support node computer, wherein said HTML page is defined by said URL for said Web browser based application;
   (a0g) returning said HTML page through said first computer network connection to said first Web browser computer; and
   (a0h) receiving said HTML page with said Web browser software in said first Web browser computer.

13. A method of communication occurring between frames within a Web browser window according to claim 12, wherein step (a0a) further comprises the step (a0a1), step (a0b) further comprises the step (a0b1), step (a0c) further comprises the step (a0c1), step (a0d) further comprises the step (a0d1), step (a0e) further comprises the step (a0e1), and step (a0g) further comprises the step (a0g1):
   (a0a1) establishing, through said Web browser software, a first browser pathway to said first computer network connection;
   (a0b1) establishing, through said Web server software, a connect pathway to said first computer network connection;
   (a0c1) establishing, through said port manager software of said Web browser based application, an accept pathway to said first computer network connection;
   (a0d1) sending said first request for said URL for said Web browser based application with said Web browser software through said first browser pathway to said first computer network connection;
   (a0e1) receiving, in said remote support node computer, said first request for said URL for said Web browser based application by said Web server software from said connect pathway through said first computer network connection; and
   (a0g1) returning said HTML page through said connect pathway, said first computer network connection, and said first browser pathway, to said first Web browser computer.

14. A method of communication occurring between frames within a Web browser window according to claim 13, wherein step (a0e1) further comprises the steps (a0e1a) through (a0e1c):
   (a0e1a) registering, through said port manager software, that said first Web browser computer is logged on to said Web browser based application;
   (a0e1b) creating, through said port manager software, a first logged browser pathway; and
   (a0e1c) passing, through said port manager software, a location of said first logged browser pathway to said first Web browser computer, wherein a subsequent predetermined program run from said pebble software that references said first logged browser pathway will send output to said first Web browser computer through said first logged browser pathway, said accept pathway, said first computer network connection, and said first browser pathway.

15. A method of communication occurring between frames within a Web browser window according to claim 14 wherein step (a0e2a) further comprises following a login procedure in registering said first Web browser computer, wherein said login procedure requires verifying a user name and a user password in a data storehouse within said remote support node.

16. A method of communication occurring between frames within a Web browser window according to claim 12, wherein step (a1) further comprises the steps (a10a) through (a10f) performed before step (a1):

(a10a) loading a copy of said Web browser software into a memory in said second Web browser computer;

(a10b) sending a second request for said URL for said Web browser based application with said copy of said Web browser software in said second Web browser computer;

(a10c) receiving said second request for said URL for said Web browser based application from said second Web browser computer by said Web server software in said remote support node computer through said second computer network connection;

(a10d) finding said HTML page in said remote support node computer, wherein said HTML page is defined by said URL for said Web browser based application;

(a10e) returning said HTML page through said second computer network connection to said second Web browser computer; and (a10f) receiving said HTML page with said copy of said Web browser software in said second Web browser computer.

17. A method of communication occurring between frames within a Web browser window according to claim 16, wherein step (a10a) further comprises the step (a10a1), step (a10d) further comprises the step (a10d1), step (a10e) further comprises the step (a10e1), and step (a10f) further comprises the step (a10f1):

(a10a1) establishing, through said copy of said Web browser software in said second Web browser computer, a second browser pathway to said second computer network connection;

(a10b1) sending said second request for said URL for said Web browser based application with said copy of said Web browser software in said second Web browser computer through said second browser pathway to said second computer network connection;

(a10c1) receiving, in said remote support node computer, said second request for said URL for said Web browser based application by said Web server software from said connect pathway through said second computer network connection; and (a10e1) returning said HTML page through said connect pathway, said second computer network connection, and said second browser pathway, to said second Web browser computer.

18. A method of communication occurring between frames within a Web browser window according to claim 17, wherein step (a10e1) further comprises the steps (a10e1a) through (a10e1c):

(a10c1a) registering, through said port manager software, that said second Web browser computer is logged on to said Web browser based application;

(a10c1b) creating, through said port manager software, a second logged browser pathway; and (a10c1c) passing, through said port manager software, a location of said second logged browser pathway to said first frame in said Web browser window in said graphics display in said second Web browser computer, wherein a subsequent predetermined program run from said pebble software that references said second logged browser pathway will send output to said second Web browser computer through said second logged browser pathway, said accept pathway, said second computer network connection, and said second browser pathway.

19. A method of communication occurring between frames within a Web browser window according to claim 18 wherein step (a10e1a) further comprises following a login procedure in registering said second Web browser computer, wherein said login procedure requires verifying a user name and a user password in a data storehouse within said remote support node.

20. A method of communication occurring between frames within a Web browser window according to claim 18 wherein said first browser pathway, said connect pathway, said accept pathway, said first logged browser pathway, said second browser pathway, and said second logged browser pathway are sockets.

21. A method of communication occurring between frames within a Web browser window, said method comprising the steps of:

(a) displaying, within said Web browser window running in a first task in a graphics display of a first Web browser computer, an HTML page having a first frame and a second frame, wherein said first frame is programming language controlled;

(b) receiving click input on a symbol in said first frame of said Web browser window in said graphics display of said first Web Browser computer wherein said click input causes a display of a web page in said second frame of said Web browser computer;

(c) receiving click input on a symbol in said second frame;

(d) sending a request for a predetermined program defined by said symbol to a second task within a remote support node computer, wherein said remote support node computer is connected to said first Web browser computer through a first computer network connection;

(e) receiving said request for said predetermined program in said second task in said remote support node computer;

(f) running said predetermined program defined by said symbol;

(g) sending output from said running of said predetermined program to port manager software in said remote support node computer, causing said port manager software to send said output to said first frame in said Web browser window in said graphics display of said first Web browser computer; and (h) displaying said output in said first frame in said Web browser window in said graphics display of said first Web browser computer.

* * * * *